G. HORVATH.
BEARING.
APPLICATION FILED FEB. 2, 1912.
1,055,398.
Patented Mar. 11, 1913.
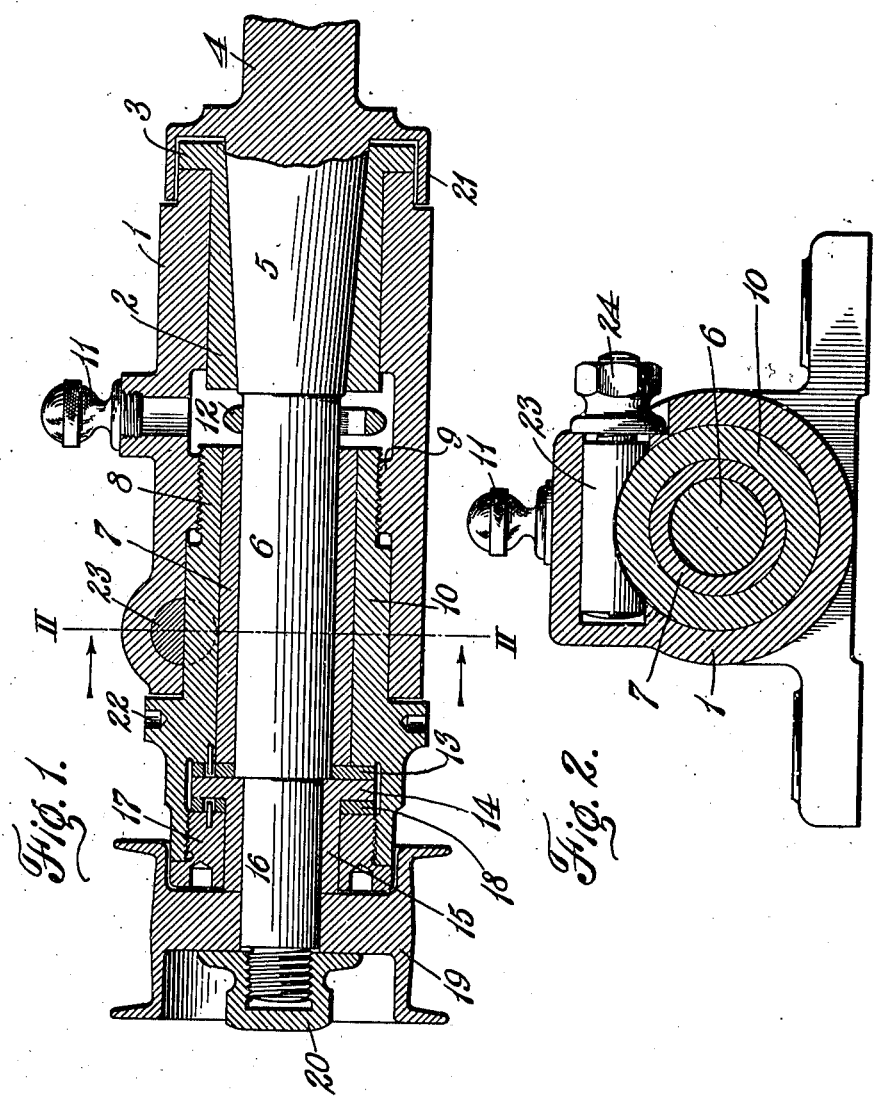
Witnesses
Chas. W. Stauffiger
Anna M. Dorr
Inventor
Geza Horvath,
By Barthel & Barthel
Attorneys

UNITED STATES PATENT OFFICE.

GEZA HORVATH, OF DETROIT, MICHIGAN, ASSIGNOR OF ONE-HALF TO ALEXANDER PATAKY, OF DETROIT, MICHIGAN.

BEARING.

1,055,398.   Specification of Letters Patent.   Patented Mar. 11, 1913.

Application filed February 2, 1912. Serial No. 674,921.

*To all whom it may concern:*

Be it known that I, GEZA HORVATH, a citizen of the United States of America, residing at Detroit, in the county of Wayne and State of Michigan, have invented certain new and useful Improvements in Bearings, of which the following is a specification, reference being had therein to the accompanying drawings.

In the mounting of grinding disks which turn at high speed and of other like devices, it is essential that the spindle or shaft on which they are secured be as firmly supported as possible in the bearing to avoid chattering, and at the same time turn freely and thereby lessen the danger of "burning" of the bearing or cutting of the journal itself. It is also desirable that the exterior of the bearing present as little obstacle as possible to the use of tools around it. Provision must also be made for taking up wear and thereby avoid jumping or chattering of the spindle in the bearing.

This invention relates to a bearing, and more especially to means for taking up slack in the bearing, for accurately adjusting the parts to firmly support the running parts and to afford sufficient lubrication.

The invention consists in the matters hereinafter set forth and more particularly pointed out in the claims.

In the drawings, Figure 1 is a view in longitudinal section through a bearing that embodies features of the invention, and Fig. 2 is a view in cross section taken on or about line 11—11 of Fig. 1.

As herein shown an outer boss or casing 1 is accurately fitted at one end to receive a tapered bored bushing 2 with end flange 3 abutting the end face of the casing. A spindle 4 has a tapered portion or section 5 adapted to fit the conical bore of the bushing 2. A cylindrical portion 6 of the spindle is rotatable in a lining sleeve 7 secured in a barrel 8 whose inner end portion has screwthreaded engagement with an inner peripheral rib 9 of the casing and whose main body portion 10 is turned to accurately fit in a corresponding part of the casing. The bore of the casing between the approximate ends of the member 2 and part 8 is enlarged as a convenient oil chamber to which access is had through a duct closed by a removable plug 11 an oil ring 12 in the chamber loosely encircling the spindle and distributing oil thereover. A thrust ring 13 is secured against the end of the lining 7 in a counterbored recess of the barrel 8 which is of greater diameter than the outer diameter of the ring. Preferably the thrust ring is of hardened tool steel or the like and abuts the flanged portion 14 of a sleeve 15 journaled on a reduced portion 16 of the spindle. A thrust nut 17 is screwthreaded into the outer counterbored recess of the barrel 8 and has a lining ring 18 abutting the outer face of the flange 14. A driving pulley 19, gear wheel or the like may be secured by means of the usual cap nut 20 on the spindle in abutment with the outer end of the member 15 but clearing the member 17.

A shield 21 on the spindle encircles the part 3 as a dust protector and the barrel 8 is provided with spanner holes 22 or the like for ready application of a turning tool or wrench. A transversely disposed binding stud 23 in the casing laterally hollowed to bear against the periphery of the member 8, may be used to clamp the latter in adjusted position by means of a nut 24 on its outer end.

By this form of construction a very long, substantially continuous bearing is obtained which is practically dust proof, which is readily lubricated, and which may be taken up to compensate for wear by rotation of the barrel 8, thereby drawing the spindle to seat in the tapered portion of the member 2. The outer clearance afforded the thrust rings prevents the latter from hindering the true centering of the spindle which depends merely upon the proper bearing bushings for support. As the exterior of the bearing has no projecting adjusting or cap screws, the bearing does not interfere with the use of tools close to it, this arrangement making it exceptionally fitted for a grinding or milling attachment to a lathe or the like. Furthermore one movement of one member, the barrel, effectively takes up the bearing without the necessity of setting up a number of clamping bolts such as are commonly used for this purpose.

Obviously, changes in the details of construction may be made without departing from the spirit of my invention and I do not care to limit myself to any particular form or arrangement of parts.

I claim,

1. The combination with an outer casing, of a taper bored bushing secured in one end thereof, a barrel counterbored at its outer end and longitudinally adjustable in the other end portion of the casing, a clamping member for the barrel, a thrust ring in the counterbored outer end of the barrel, a spindle having a tapered portion fitting the tapered sleeve, a cylindrical portion fitting the barrel and a reduced portion beyond the barrel, a thrust sleeve journaled on the reduced portion having an annular collar bearing against the thrust ring, a thrust nut screwthreaded into the recess of the barrel against the outer face of the collar and a clamping nut on the reduced end of the spindle.

2. The combination with a casing of a taper bored bushing secured in one end portion thereof, and provided with an end flange abutting the casing end, a take up barrel having an inner end portion screwthreaded into the middle portion of the casing, and a cylindrical body portion journaled in the casing and a counterbored outer end, a thrust ring seated in the counterbored end portion of the barrel, a spindle extending through the casing and having a tapered portion journaled in the bushing, a body portion journaled in the barrel and a reduced end portion extending through the counterbored recess of the barrel, the resultant shoulder of the spindle being in substantial alinement with the bearing face of the thrust ring, a thrust sleeve journaled on the reduced portion of the spindle and provided with an enlarged inner end portion bearing against the thrust ring and spindle shoulder, a thrust nut screwthreaded into the outer counterbored recess of the barrel and adapted to bear against the outer face of the enlarged end portion of the thrust sleeve, and a retaining nut on the outer reduced end portion of the spindle.

3. The combination with a casing, of a taper bored bushing secured in one end portion thereof, and provided with an end flange on the sleeve abutting the casing end, a take up barrel provided with a recessed outer end an inner end portion screw threaded into the middle portion of the casing and a cylindrical body portion journaled in the casing, a thrust ring seated in the counterbored recess in the outer end portion of the barrel, a spindle extending through the casing and having a tapered portion journaled in the bushing, a body portion journaled in the barrel and a reduced end portion extending through the counterbored recess of the barrel, the resultant shoulder of the spindle being in substantial alinement with the bearing face of the thrust ring, a thrust sleeve journaled on the reduced portion of the spindle and provided with an enlarged inner end portion bearing against the thrust ring and spindle shoulder, a thrust nut screwthreaded into the outer counterbored recess of the barrel and adapted to bear against the outer face of the enlarged end portion of the thrust sleeve, a retaining nut on the outer reduced end portion of the spindle, and a transversely disposed binding stud in the casing adapted to secure the barrel in adjusted position.

4. The combination of a casing having a substantially cylindrical bore with an inner peripheral screwthreaded rib between its ends, of a taper bored bushing secured in one end portion of the casing, a barrel rotatable in the other end portion of the casing in screwthreaded engagement with the inner rib thereof provided with a counterbored outer end, a thrust ring seated concentrically in the base of the counterbored recess in the outer end of the barrel, a spindle journaled in the tapered sleeve and barrel having a reduced end portion extending through the counterbored recess, a thrust sleeve journaled on the reduced portion of the ring having a flange on its inner end in abutment with the thrust ring, a thrust nut screwthreaded into the counterbored end portion of the barrel in abutment with the outer face of the thrust sleeve flange, a retaining nut on the reduced end portion of the spindle, and a clamping stem longitudinally adjustable transversely in the casing and bearing against the barrel laterally.

In testimony whereof I affix my signature in presence of two witnesses.

GEZA HORVATH.

Witnesses:
ANNA M. DORR,
C. R. STICKNEY.